United States Patent [19]

Lee

[11] Patent Number: 4,761,065

[45] Date of Patent: Aug. 2, 1988

[54] INSPECTION DEVICE WITH ADJUSTABLE VIEWING SCREEN

[76] Inventor: Ah Soon Lee, Apartment Block 470 Jurong West 08-443, Street 41, Singapore, Singapore, 2264

[21] Appl. No.: 882,248

[22] Filed: Jul. 7, 1986

[51] Int. Cl.$^4$ ................................................ G02B 7/02
[52] U.S. Cl. ..................................... 350/576; 350/577
[58] Field of Search .............. 350/574, 576, 577, 508, 350/538, 445, 575; 353/65, 75

[56] References Cited

U.S. PATENT DOCUMENTS 1,682,139  8/1928  Mitchell .............................. 350/538
3,434,773  3/1969  Pitchford ............................ 350/538

Primary Examiner—John K. Corbin
Assistant Examiner—Ronald M. Kachmarik
Attorney, Agent, or Firm—Fisher, Christen & Sabol

[57] ABSTRACT

An inspection device which can be used to enable a visitor on the outer side of a door (12) to be viewed from the inner side has a tube (1) extending through the door. At the end of the tube (1) on the inner side of the door there is a screen (36) and a lens system (5, 23) is provided to produce a viewable image of the visitor on the screen (36). The positioning of the screen (36) relative to the tube (1) can be adjusted e.g. with a rack and pinion mechanism (39, 40, 41) operated by a knob (42), and an image inverter such as a prism (43) is provided to give an upright image on the screen (36).

7 Claims, 2 Drawing Sheets

INSPECTION DEVICE WITH ADJUSTABLE VIEWING SCREEN

This invention relates to an inspection device to enable a person at one side of a door or wall or other concealing structure to view a region on the opposite side thereof.

Inspection devices are commonly mounted in outer doors of premises to enable a person inside the premises to view a visitor standing in front of the door before the door is opened. Known such devices comprise small wide angle lens systems and with these there is the problem that there may be much distortion of the field of vision. Also, it is necessary for the preson inside the premises to look directly into the inspection device for viewing purposes and this may not always be convenient especially if the positioning of the device is not closely matched to the height of the person.

An object of the present invention is to provide an inspection device which is capable of providing a clear, easily viewed image.

According to the invention therefore there is provided an inspection device for use with a structure to permit viewing therethrough comprising a light transmitting passage adapted to be mounted relative to said structure so as to extend therethrough from an outer side to an inner side thereof, a viewing screen arranged to be mounted relative to said passage at the inner side of the structure, and an image producing system adapted to project an image on said screen of a region in the vicinity of the outer side of said structure as transmitted through said passage.

With this arrangement viewing can be effected in a particularly simple and convenient manner by inspection of the screen. Moreover, by appropriate selection of the image producing system and having regard to the fact that the image is projected on and distributed over the screen it is possible to produce a clear, easily inspectable image.

The said light transmitting passage may comprise a tube extending through and fixed relative to the door or other structure.

The image producing system preferably comprises a lens system which conveniently may include a wide angle collecting lens and a magnifying projection lens. Preferably also an image rectifying device, such as a porroprism, is provided to ensure that the projected image on the screen is not inverted.

A focusing arrangement may be provided and this may comprise an adjustable connection between the screen and the light transmitting passage and/or the image producing system. For example, the screen may be mounted in a housing which is movable towards and away from the light transmitting passage with a suitable manually operable adjustment device, such as a rack and pinion arrangement. The focusing range is preferably wide, e.g. from infinity to 15 cm.

The invention will now be described further by way of example only and with reference to the accompanying drawings in which.

Figure 3:
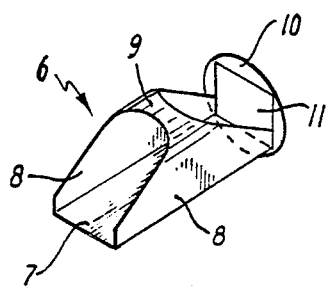
FIG. 3 is a perspective view of a porroprism holder incorporated in the device.

The inspection device shown in the drawings has a tube 1 of circular cross-section say 5.6 cm long and 1.9 cm external diameter. At one end the tube has an outwardly projecting peripheral flange 2 and the opposite end portion 3 is threaded on its outer surface. Inside the tube 1 there is an inwardly projecting circumferential lip 4 close to the flanged end. A light collecting lens 5 is fixedly mounted within the flanged end against the lip 4. In the central region of the tube there is a porroprism holder 6 having a base wall 7, side walls 8 linked by a top part 9 and a circular end wall 10 with a square central opening 11 (see FIG. 3). This end wall is slightly larger than the rest of the holder 6 and fits securely against the lip 4 between this and the lens 5. A porroprism 43 is securely retained within the holder 6.

Figure 2:
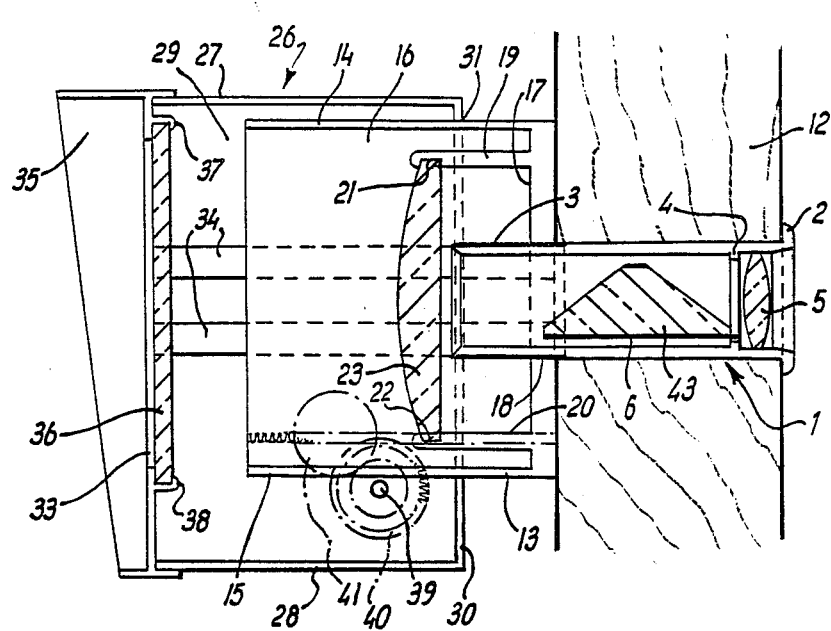
FIG. 2 is a sectional view of the device of FIG. 1.

The tube 1 so far described is fitted through a hole in a door 12, as shown in FIG. 2, with the flange 2 abutting the outer side of the door and the threaded end portion 3 projecting freely at the inner side.

A lens housing 13 of cubical shape having square walls at the top, bottom, sides and one end (respectively 14, 15, 16, 17), is fitted tightly in position around the tube 1 with the end wall 17 abutting the inner surface of the door 12 by engagement of a threaded hole 18 in the centre of the end wall 17 with the threaded end portion 3 of the tube 1. Top and bottom flanges 19, 20 project from the end wall 17 parallel and close to the top and bottom walls 14, 15 within the lens housing 13. The flanges 19, 20 have grooves 21, 22 in the confronting faces thereof and a square magnifying lens 23 is held in these grooves slightly in front of the adjacent end of the tube 1. The slight clearance between the lens 23 and the tube 1 allows for variations in door thicknesses. The end of the cubical housing 13 opposite the end wall 17 is freely open.

Figure 1:
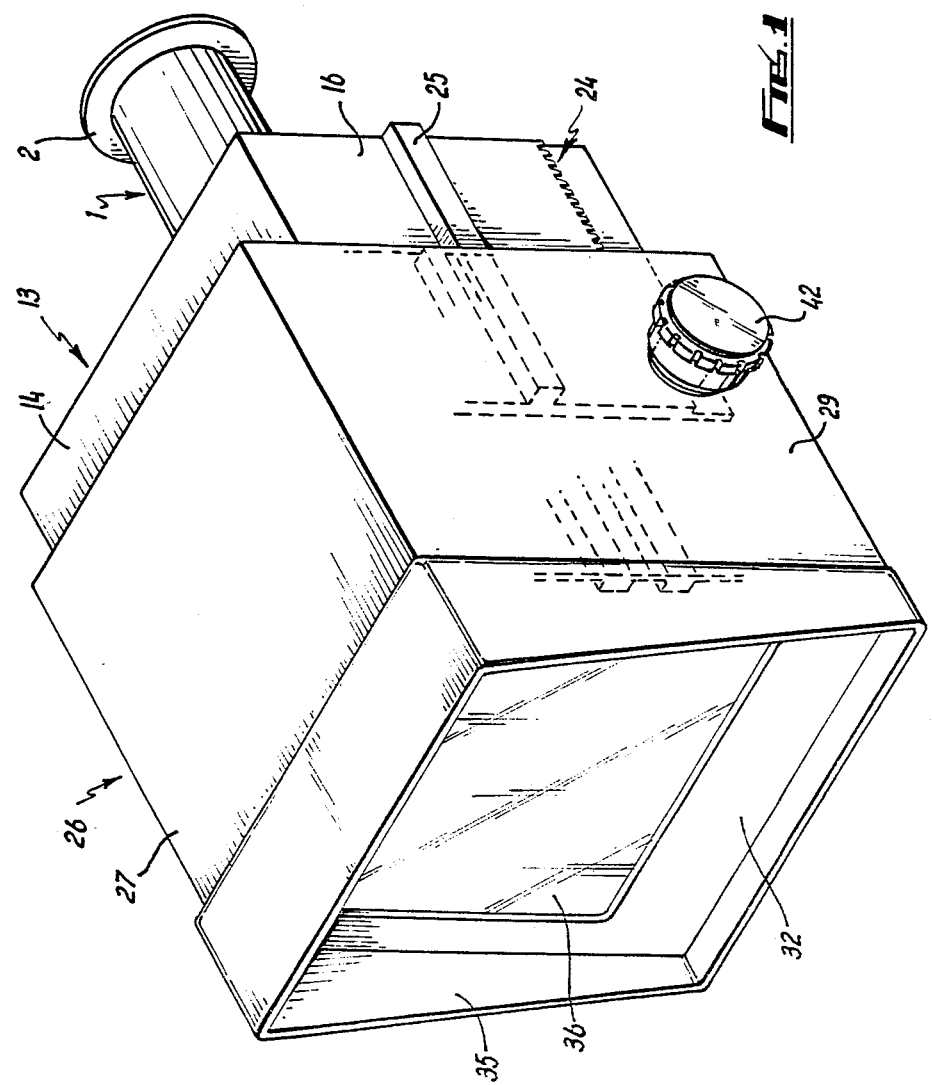
FIG. 1 is a perspective view of one form of a device according to the invention.

As shown in FIG. 1, the two side walls 16 are cut back along their lower edges and are provided with teeth to define downwardly facing racks 24. A respective projecting square section rib 25 extends centrally along the outer surface of each side wall 16, such ribs 25 extending parallel to the racks 24.

Around the lens housing 13 there is mounted a second, larger cubical housing 26 having a top wall 27, a bottom wall 28, opposite side walls 29, a rear end wall 30 with a square aperture 31 offset towards the top wall 27, and a front end wall 32 with a similar square aperture 33 aligned with the rear aperture 31. The rear aperture 31 is dimensioned to fit slidably around the housing 13 around the entire periphery thereof, there being appropriately positioned cutouts at sides of the aperture 31 to accommodate the ribs 25. The inner surfaces of the side walls 29 each have thereon a pair of spaced ribs 34 extending parallel to the top and bottom walls 27, 28 and which define therebetween guide slots to receive slidably the two ribs 25 on the lens housing 13. The front wall 32 is formed as a separate part which is clipped into tight engagement with the walls 27, 28, 29. An integral shielding structure 35 is provided around the periphery of the wall 32 externally of the housing 26 and a translucent ground glass screen 36 is fixed across the aperture 33 within the housing 26 between top and bottom flanges 37, 38 on the wall 32.

A spindle 39 is freely rotatably mounted within the housing 26 between the side walls 29 beneath the lens housing 13. The spindle 39 supports two toothed wheels 40 respectively at opposite ends and these mesh with the racks 24. A further wheel 41 meshes with one of the wheels 40 and is rotatably connected to a knob 42 on the outer side of one side wall 29 of the housing 26. The arrangement is such that rotation of the knob 42 causes the housing 26 to slide towards and away from the door 12.

In use, an image is projected onto the ground glass screen 36 of a region in the vicinity of the door on the outer side thereof. The image is focused as desired with the knob 42 to give a sharp picture with minimal distortion. The image is collected by the lens 5 and is projected and enlarged by the lens 23. The porroprism 43 acts to rectify inversion of the image. The screen size may be say 5.2 cm square and a good sized, clear image can be produced which can be conveniently viewed.

The tube 1 and housings 13, 26 may be formed from any suitable material or combinations of materials such as opaque plastics or the like.

It will be noted that the optical system i.e. the lenses 5, 23, the porroprism 43 and the screen 36 have a common straight optical axis, and the plane of the screen is at right angles to the axis of the tube 1. Also the screen 36 is adjustable towards and away from the tube 1 along the axis of the tube 1. Thus a convenient, compact construction results.

It is of course to be understood that the invention is not intended to be restricted to the details of the above embodiment which are described by way of example only. For example, the lenses 5, 23 and/or the screen 36 may be made from a plastics material (e.g. acrylic plastics) rather than glass; and the screen 36 may be made translucent in any suitable manner e.g. by frosting or otherwise to any suitable degree. The prism 43 can also be made of plastics material (e.g. acrylic plastics) and may be a normal square prism rather than a porroprism.

In a simplified version of the above described embodiment, one or both of the lenses 5, 23 may be omitted, projection of the image on the screen 36 being achieved by an appropriate single simple or complex lens (e.g. in the position of lens 5), or by use of a special screen, such as a fresnel screen, on which the image can be formed using the prism alone, or otherwise than with lenses (e.g. by use of a pin hole in place of lens 5). Also, focusing may be achieved by any suitable mechanism other than the rack and pinion drive described above and it may even be possible to omit any provision for focusing. Thus the outer housing 26 may be omitted or combined with the housing 13.

I claim:

1. An inspection device adapted to permit viewing through a structure comprising opposed faces at inner and outer sides thereof, said device comprising a tube providing a light transmitting passage therethrough, said tube being adapted to be mounted relative to said structure so as to extend therethrough from said outer side to said inner side and having forward and rear ends and abutment means at said forward end adapted to abut said outer side to locate said tube relative to said structure, a collecting lens located in said passage at said forward end, a first housing adapted to be detachably mounted at said rear end coaxially with said passage and having a magnifying projection lens mounted therein, a second housing mounted on said first housing for movement axially thereof, and a viewing screen mounted in said second housing.

2. A device according to claim 1, characterised in that the viewing screen and said lenses have a common, straight optical axis.

3. A device according to claim 1, further comprising an image rectifying device, to ensure that the projected image on the screen is not inverted.

4. A device according to claim 3, characterised in that the image rectifying device is provided within the passage.

5. A device according to claim 3, characterised in that the image rectifying device is a porroprism.

6. A device according to claim 1, wherein a manually operable adjustment device is provided for effecting movement of said second housing relative to said first housing.

7. A device according to claim 6, wherein said adjustment device comprises a rotatable knob operably connected to a rack and pinion mechanism.

* * * * *